United States Patent
Chen

(10) Patent No.: US 6,454,065 B1
(45) Date of Patent: Sep. 24, 2002

(54) WHEEL RACK IMPROVEMENT OF A TROLLEY SUITCASE

(76) Inventor: Chieh-Chiung Chen, P.O. Box 697, Feng-Yuan City 420 (TW)

(*) Notice: Subject to any disclaimer, the term of this patent is extended or adjusted under 35 U.S.C. 154(b) by 22 days.

(21) Appl. No.: 09/901,184

(22) Filed: Jul. 6, 2001

(51) Int. Cl.[7] .............................. A45C 5/14; A45C 13/26
(52) U.S. Cl. ..................... 190/18 A; 16/18 B; 16/47; 280/47.315; 280/37
(58) Field of Search .................. 190/18 A, 115; 16/47, 48, 18 B, 64; 280/47.315, 47.371, 37, 655

(56) References Cited

U.S. PATENT DOCUMENTS

| | | | | |
|---|---|---|---|---|
| 2,123,707 A | * | 7/1938 | Block | 16/18 B |
| 5,533,231 A | * | 7/1996 | Bai | 16/34 |
| 5,709,400 A | * | 1/1998 | Bonnier et al. | 280/655 X |
| 5,758,752 A | * | 6/1998 | King et al. | 190/18 A |
| 5,815,885 A | * | 10/1998 | Chen | 16/18 B |
| 6,279,705 B1 | * | 8/2001 | Wu | 190/18 A |
| 6,289,554 B1 | * | 9/2001 | Wang | 16/34 |
| 6,345,414 B1 | * | 2/2002 | Chen | 190/18 A |

* cited by examiner

*Primary Examiner*—Lee Young
*Assistant Examiner*—Tri M. Mai

(57) ABSTRACT

A wheel rack improvement of a trolley suitcase includes a pair of corner seats and a central seat secured to the lower portion of the suitcase. The corner seats each has a main prop and subordinate prop rotatably secured therein and overlapped each other. The central seat has a footboard rotatably secured by a link and a rotor, a pair of axial pipes spacedly secured to the back of the central seat each including a male pipe and a female pipe axially sleeve with each other. An insertion rod engageable with a positioning hole of the subordinate prop biased by a spring. A steel wire has a first enlarged head retained in a slot of the insertion rod and a second enlarged head retained in a slot of the rotor for controlling the insertion rod the engage or disengage with the positioning hole of the subordinate prop. Therefore, the props may separate with each other to make a four wheels touching the ground.

2 Claims, 12 Drawing Sheets

WHEEL RACK IMPROVEMENT OF A TROLLEY SUITCASE

BACKGROUND OF THE INVENTION

The present invention relates to trolley suitcase and more particularly to a wheel rack improvement of a trolley suitcase.

Figure 1:
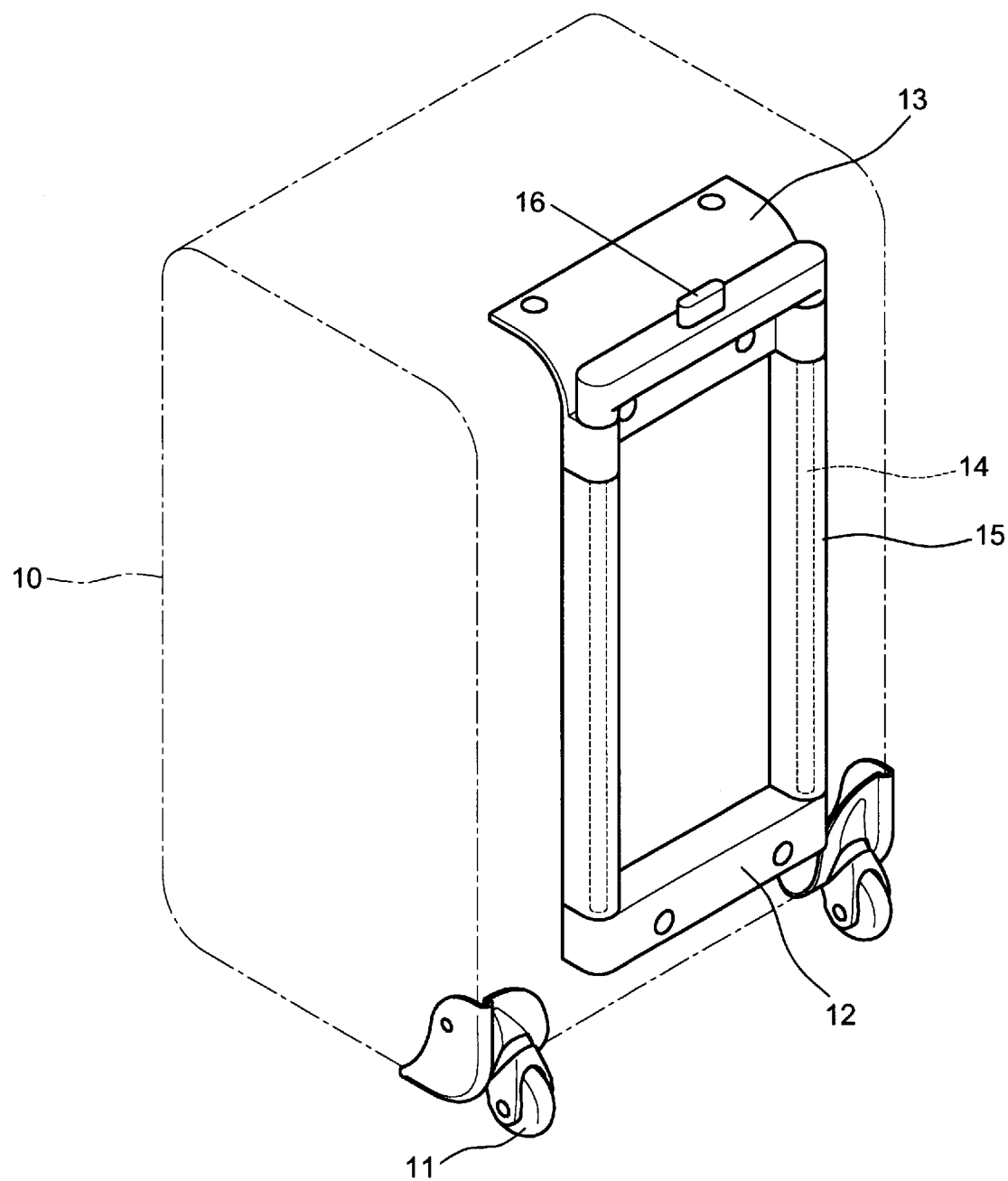

A trolley suitcase is indispensable in traveling. Typical trolley suitcase 10 (as shown in FIG. 1) includes a pair of wheels 11 on the bottom for enabling the suitcase to be slidable on the ground, a lower seat 12 secured to a lower portion of the suitcase, an upper seat 13 secured to a top of the suitcase, a pair of tubular sleeves 15 spacedly disposed between the upper and the lower seat 12 and 13 for protecting a puller 14 which is slidably disposed inside the tubular sleeves 15 and a press button 16 on the top of the puller 14 for releasing a positioning device between the tubular sleeves 15 and the puller 14 which may draw out of the tubular sleeves 15 to pull the suitcase 10 sliding on the ground along with the walking of a traveler. Although a large part of the weight is shared by the wheels 11 when the suitcase 10 is lilt. But a certain part of weight is burdened by the hand of the traveler. If the suitcase 10 is very heavy, the traveler burdens more weight.

SUMMARY OF THE PRESENT INVENTION

The present invention has a main object to provide a wheel rack improvement of a trolley suitcase having a pair of corner members each of which has a main prop and a subordinate prop operated by a puller or a footboard. When the trolley suitcase is tilt relative to the ground, the center of gravity of the main prop is displaced to depart from the subordinate prop. So that the wheels of the props all touch the ground.

The present invention will become more fully understood by reference to the following detailed description thereof when read in conjunction with the attached drawings.

BRIEF DESCRIPTION THE DRAWINGS

Figure 2:
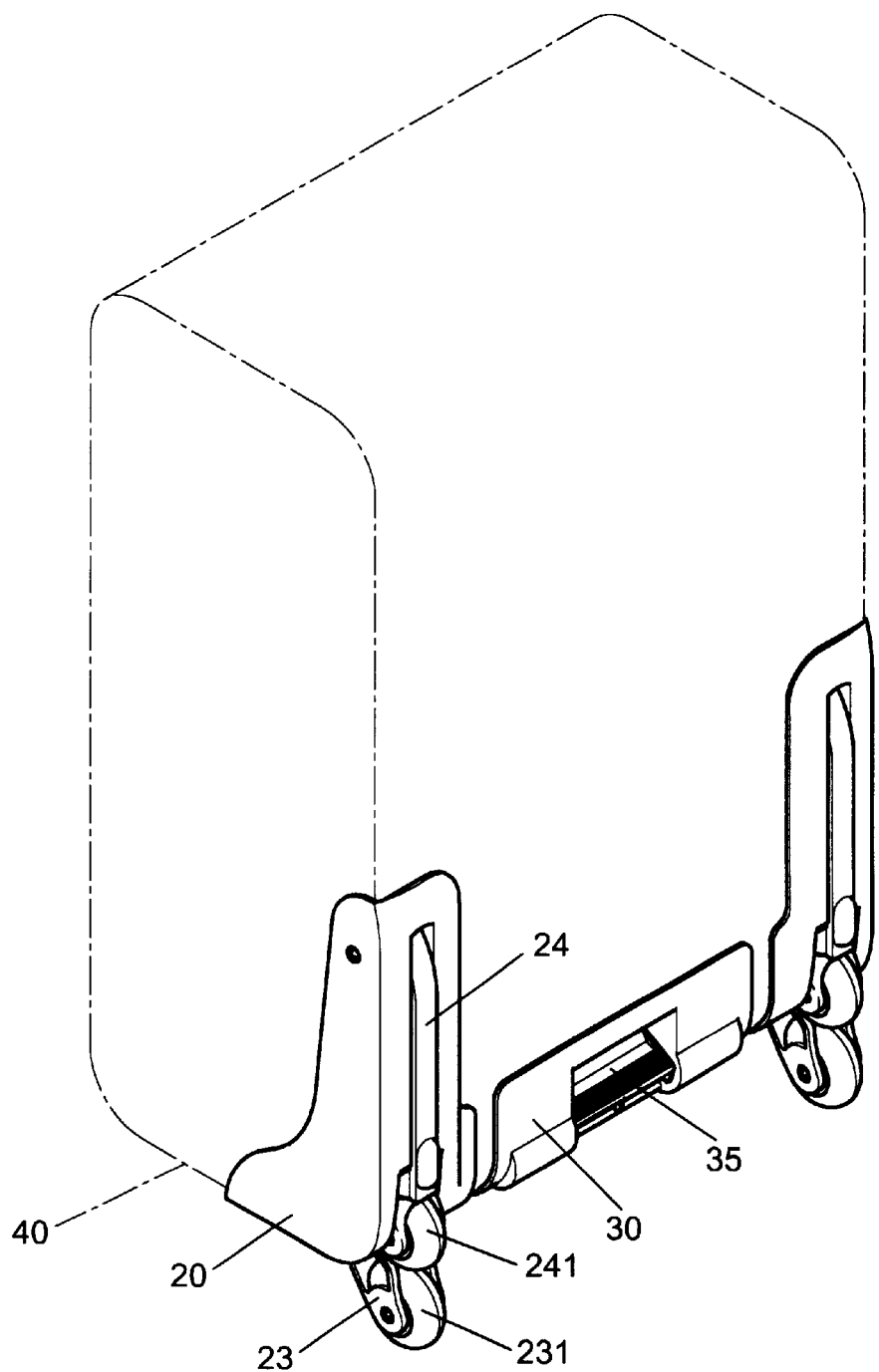
Figure 3:
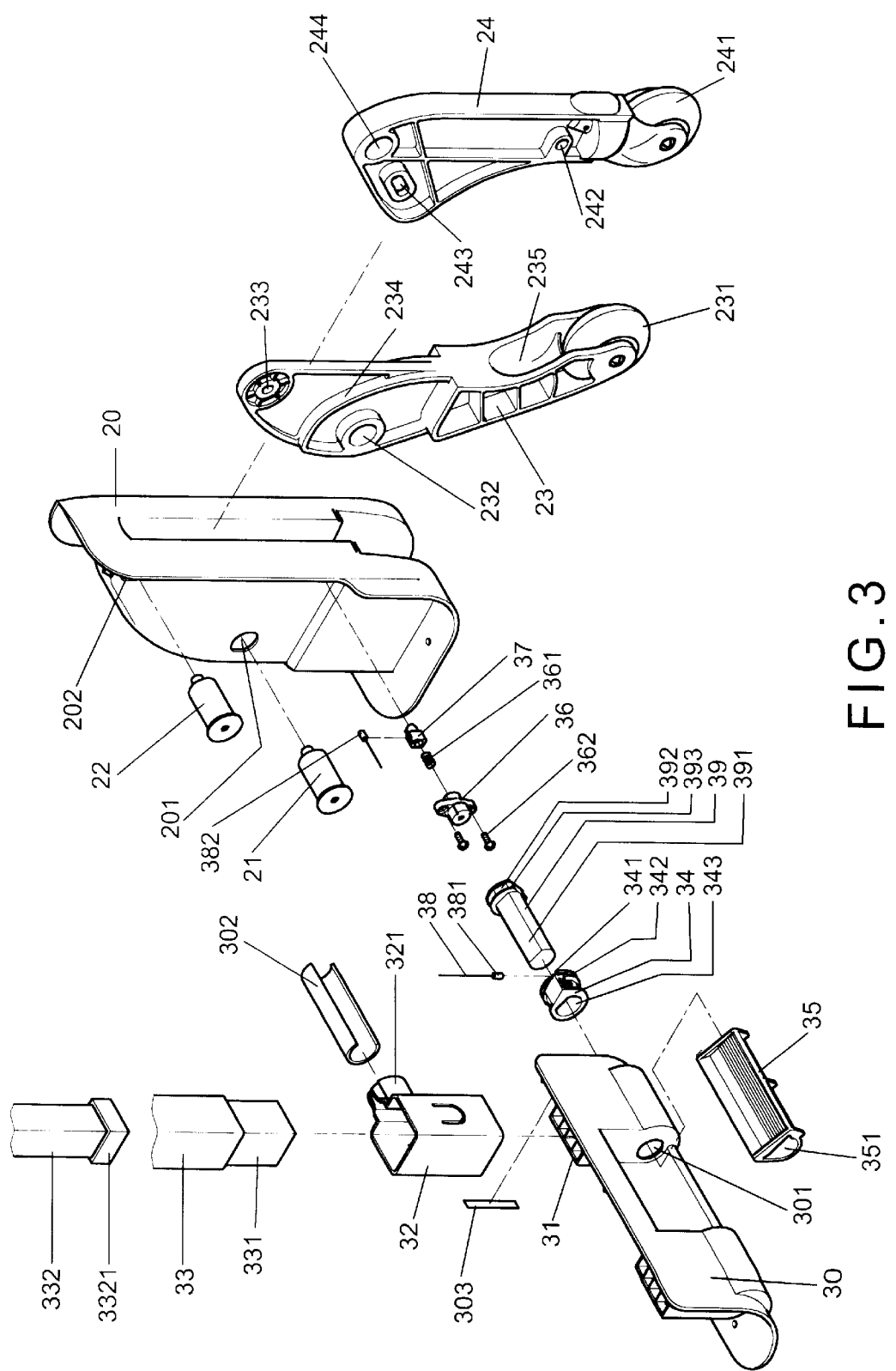
Figure 4:
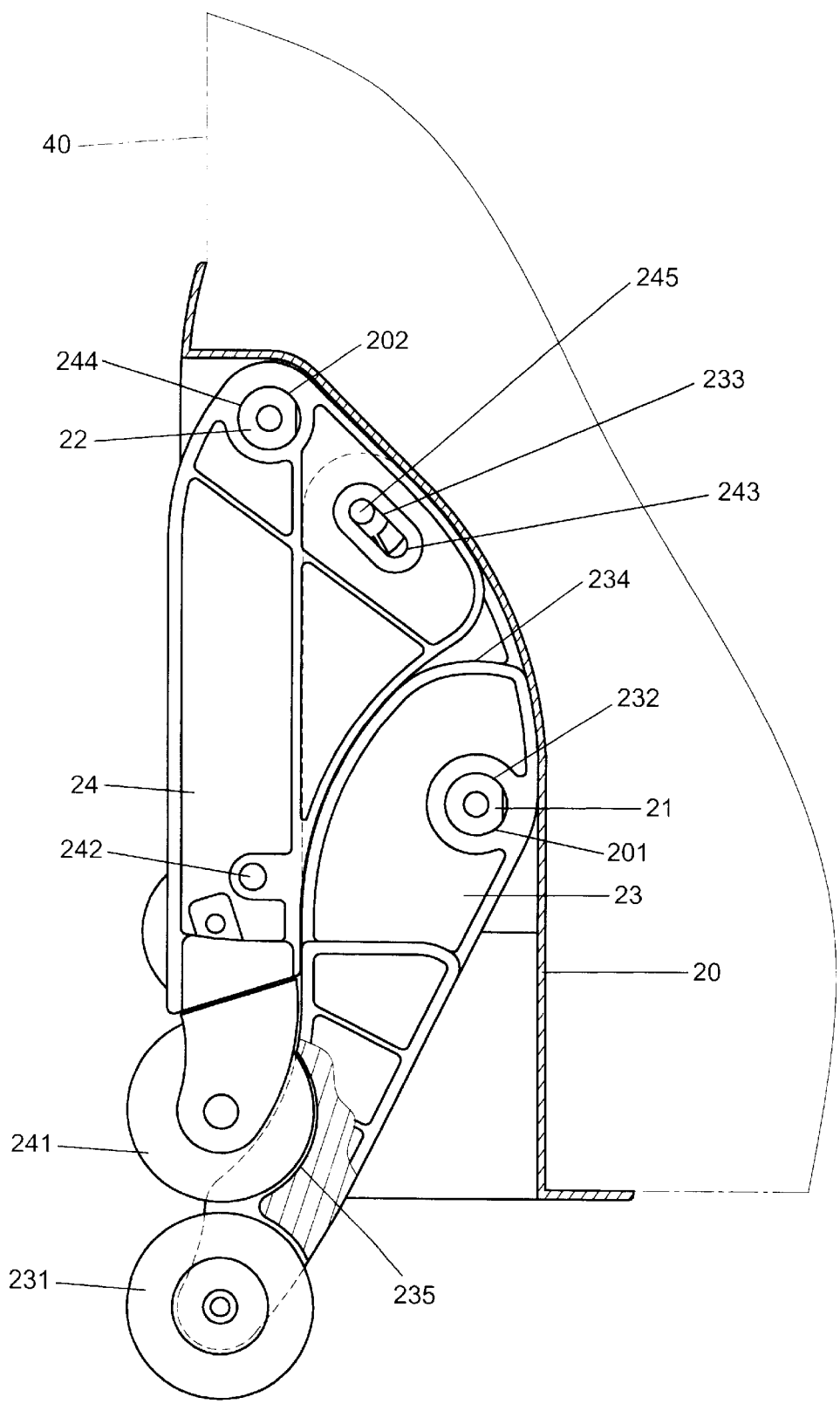
Figure 5:
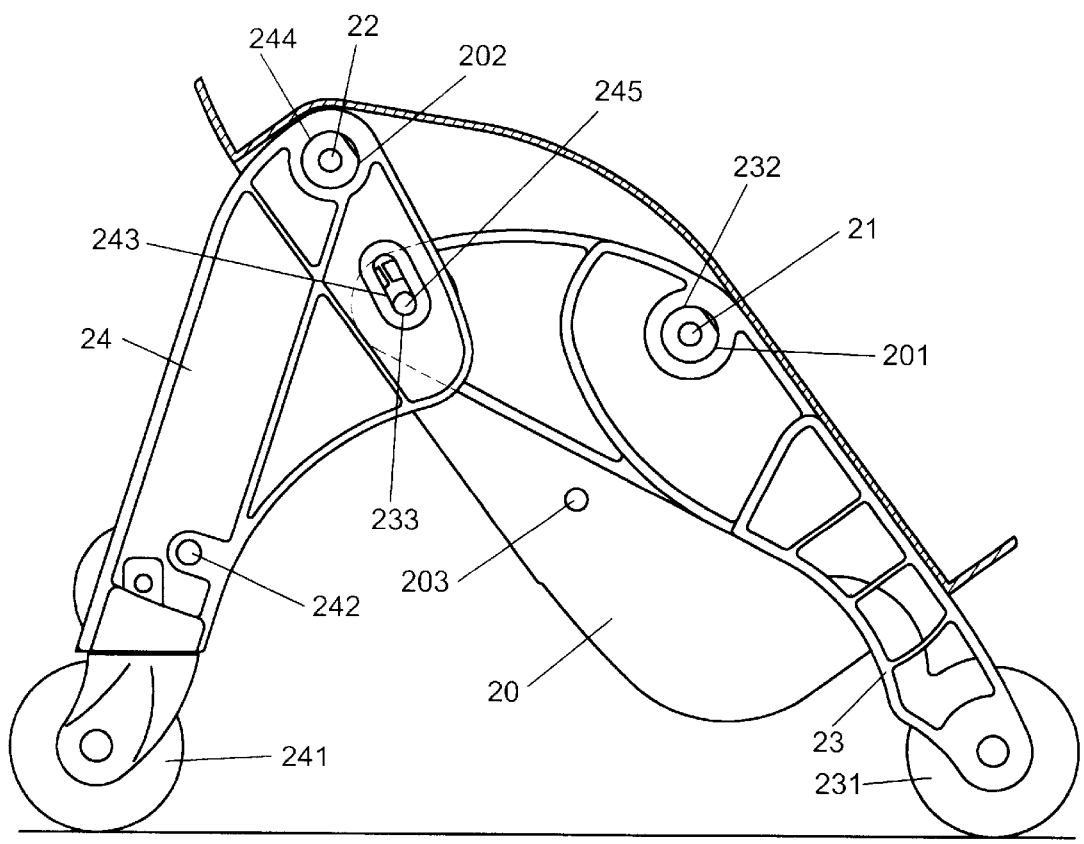
Figure 6:
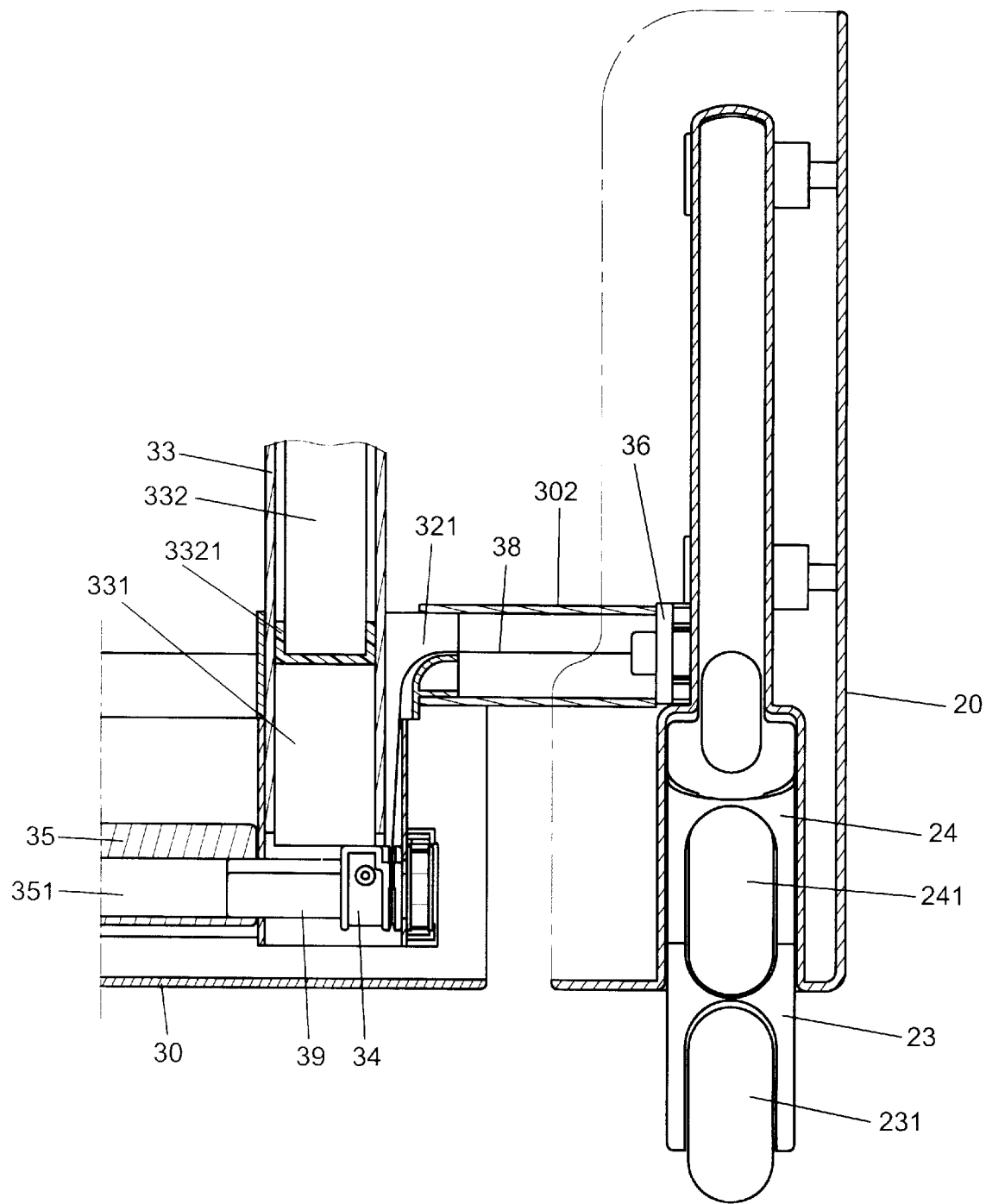
Figure 7:
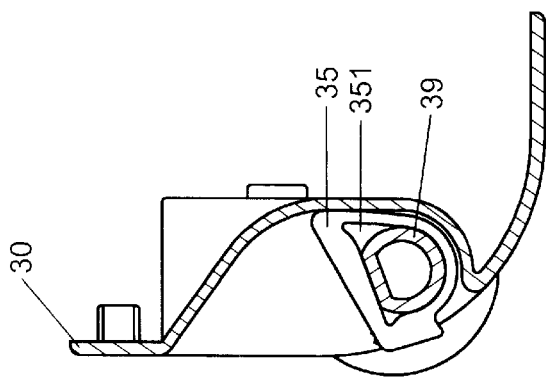
Figure 8:
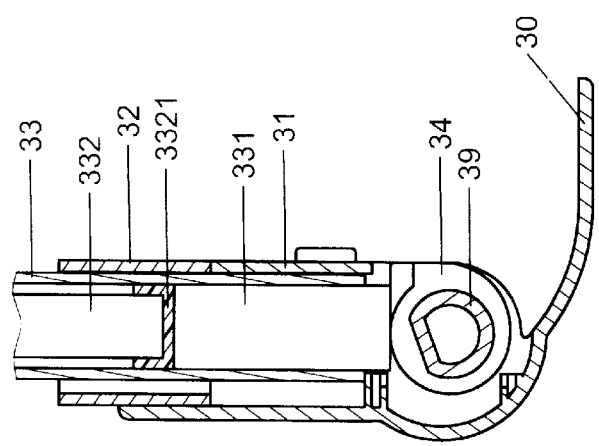
Figure 9:
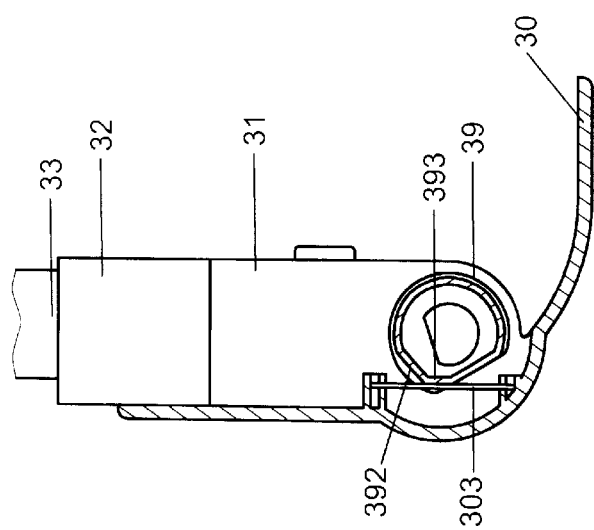
Figure 10:
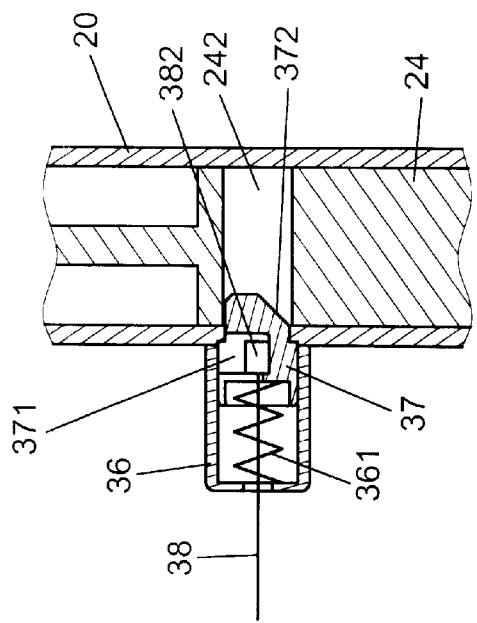
Figure 11:
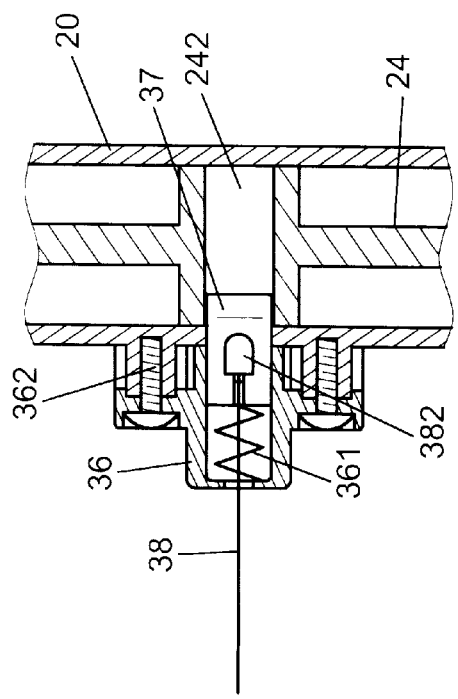
Figure 12:
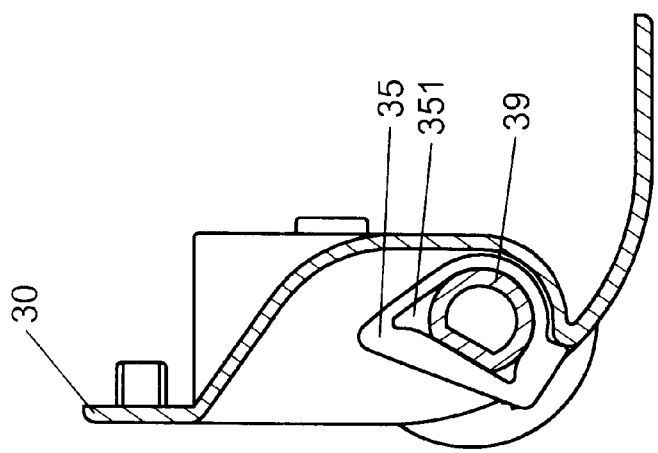
Figure 13:
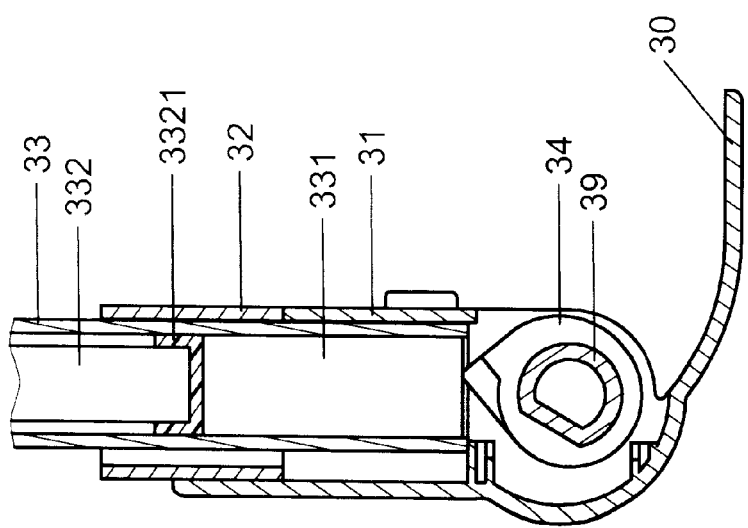
Figure 14:
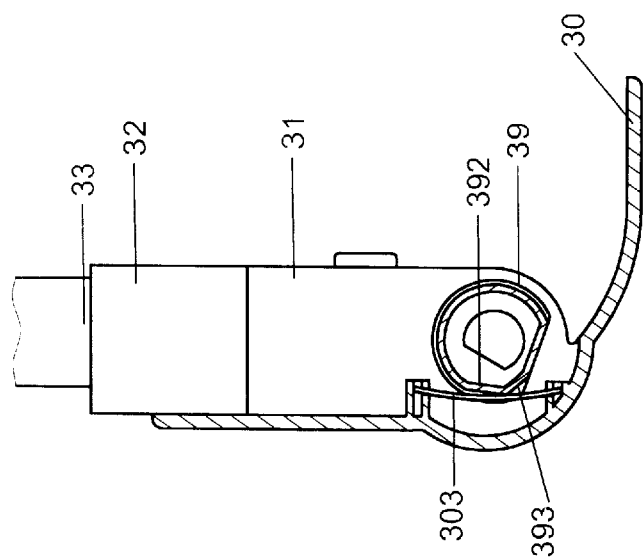
Figure 15:
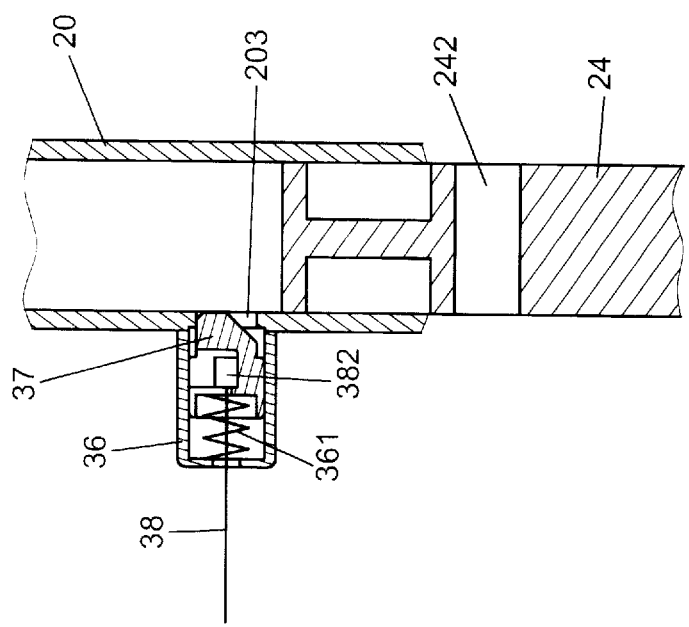
Figure 16:
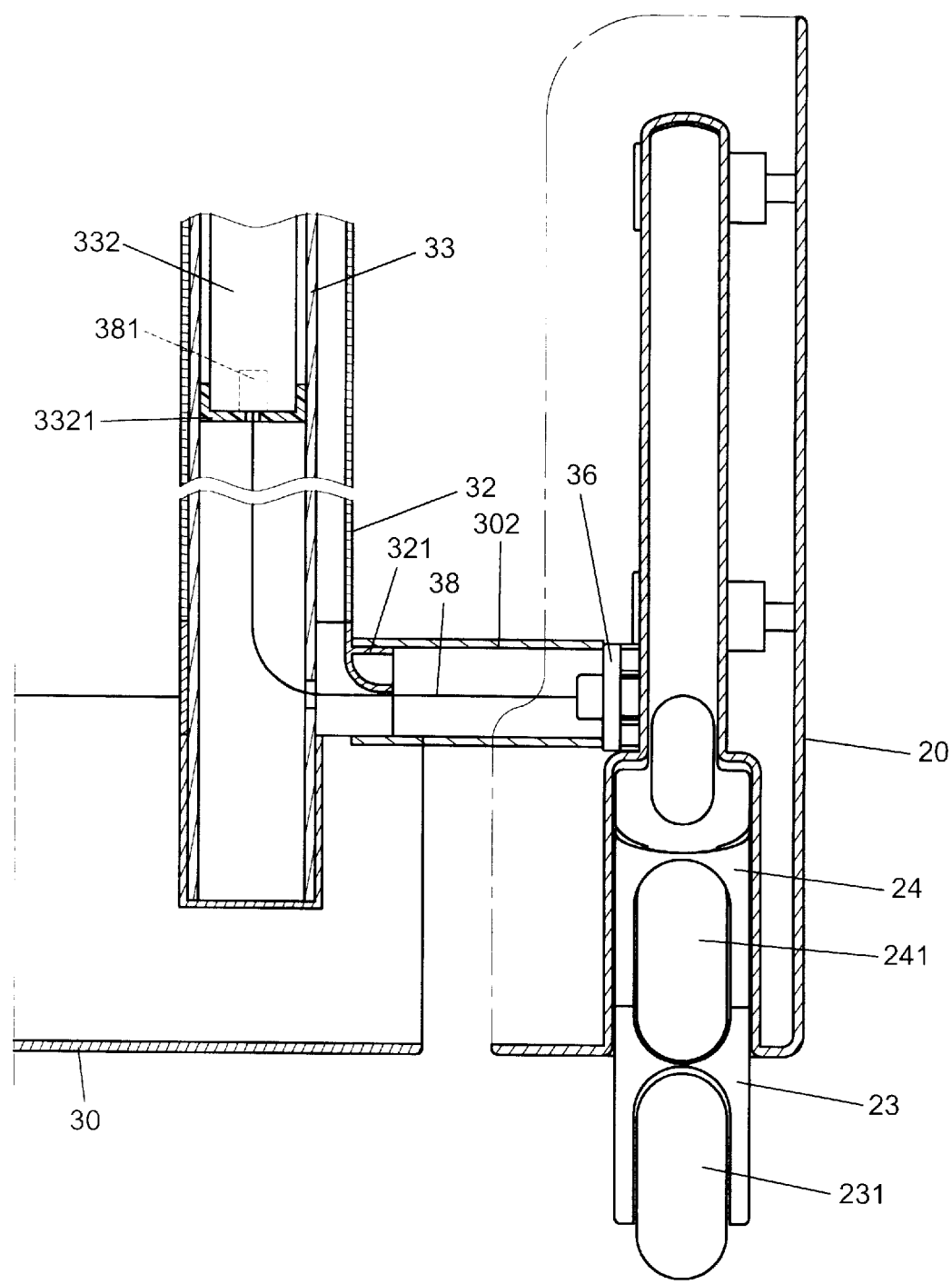
Figure 17:
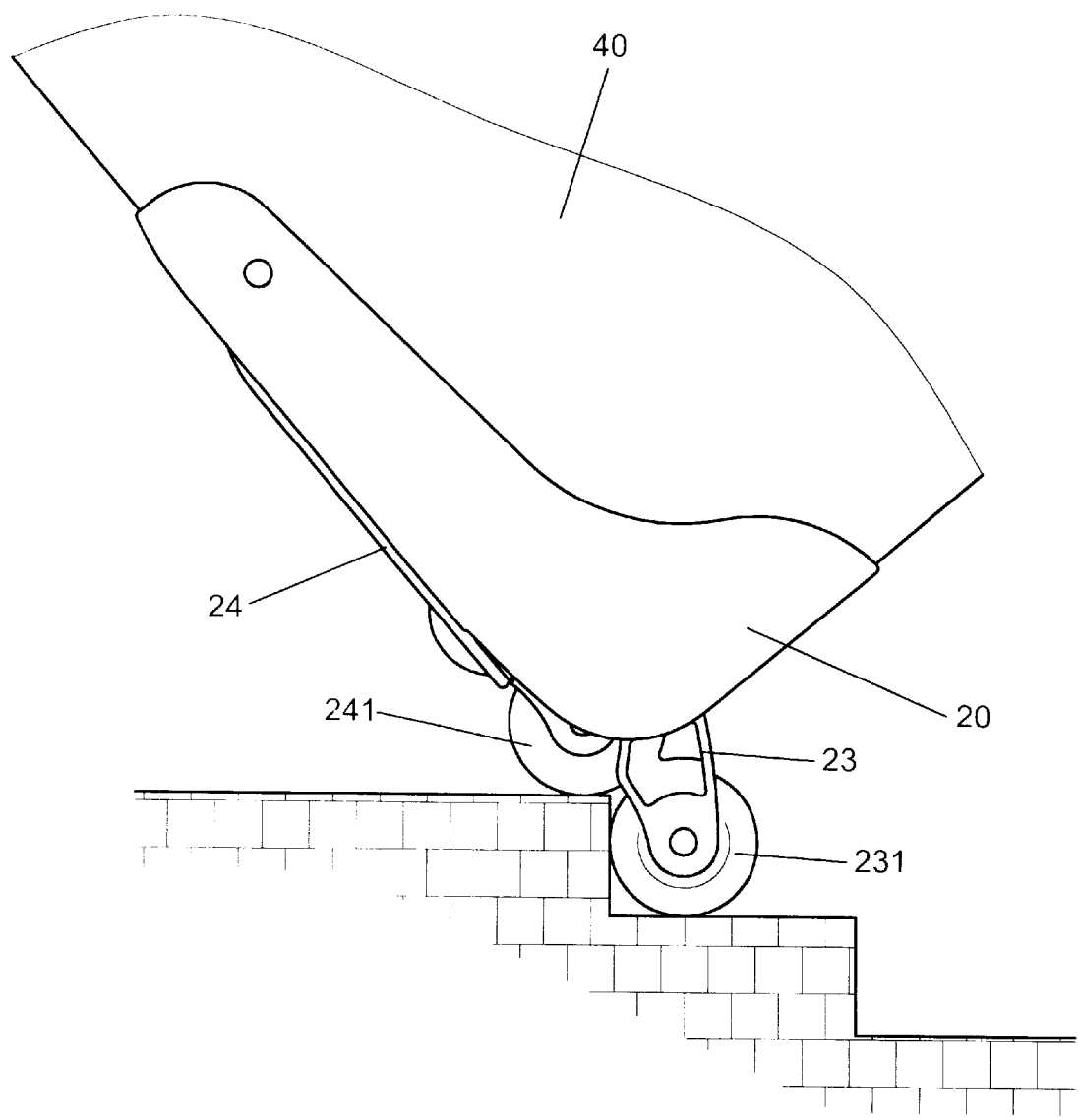

FIG. 1 is a perspective view to show a trolley suitcase according to a or art,

FIG. 2 is a perspective view to show a trolley suitcase of the preferred embodiment according to the present invention, FIG. 3 is an exploded perspective view of the preferred embodiment of the present invention, FIG. 4 is a plane view with partial sectional view to show a main prop combined with the subordinate prop, FIG. 5 is a plane view to show that the main prop is departed from the subordinate prop, FIG. 6 is a sectional view to show the assembly of the partial element of the present invention, FIG. 7 is a sectional view to show that the footboard is not to tread upon, FIG. 8 is a sectional view to show a rotor before that the footboard to tread upon, FIG. 9 is a sectional view to a rotatable link touched to a spring plate, FIG. 10 is a cross sectional view an insertion rod engaged with the position hole of the subordinate prop, FIG. 11 is a longitudinal sectional view to show the insertion rod relative to the positioning hole of the subordinate prop, FIG. 12 is a sectional view to show that the footboard is to tread upon, FIG. 13 is a sectional view to show the rotor after that the footboard is to tread upon, FIG. 14 is a sectional view to show that the upper truncated surface of the rotatable link touched to the spring plate, FIG. 15 is a sectional view to show that the insertion rod is disengaged with the positioning hole of the subordinate prop, FIG. 16 is a sectional view partial assembly of an alternate embodiment of the present invention, and FIG. 17 is a plane view to show that the trolley suitcase of the prevent invention is pulled to upstairs.

DETAILED DESCRIPTION OF THE PREFERRED EMBODIMENT

The wheel rack improvement of the trolley suitcase of the present invention includes two preferred embodiments. The first preferred embodiment (as shown in FIGS. 2, 3 and 6) comprises a suitcase 40, a pair of corner seats 20 and a central seat 30 secured to the bottom of the suitcase 40, a pair of female pipe 33 secured to a pair of the positioning plate 31 of the central seat 30 by screws, a press plate 331 in the lower distal of the female pipe 33, a male pipe 332 including a cushion 3321 on lower distal inserted into the top of the female pipe 33 and an axial pipe 32 sleeved onto the lower distal of the female pipe 33. The axial pipe 32 has an axial ring projected outward from an upper periphery. The corner seats 20 each has a first thru hole 201, a second thru hole 202 and a third thru hole 203 (as shown in FIG. 5) in an inward peripheral wall, a main prop 23 and a subordinate prop 24. The main prop 23 has a wheel on lower end a lower axial hole 232 engaged with the first thru hole 201 and rotatably secured by axial pin 21, an upper axial hole 233, an axial rod 245 (as shown in FIG. 4), an arcuate rib 234 and a depression 235. The subordinate prop 24 has a wheel 241 on lower end engageable into the depression 235 of the main prop 23, a positioning hole 242 engageable with the third thru hole 203 of the corner seat 20, an oblong hole 243 engaged with the axial rod 245 of the main prop 23 and an axial hole 244 engaged with the second thru hole 202 of the corner seat and rotatably secured by axial pin 22. An insertion rod 37 inserts into the third thru hole 203 engageable with the positioning hole 242 of the subordinate prop 24 (as shown in FIGS. 10 and 11) and having a central bore, a slot 371 in a top engaged with an enlarged head 382 of a steel wire 38, a bevel angle 372 on forward end. A positioning cap 36 wraps on the insertion rod 37 and secures on an inward periphery of the corner seat 20 biased by a spring 361 therebetween.

The central seat 30 has a pair positioning plate 31 on the back, a pair of circular thru holes 301 in two side for axially connected a footboard 35 by a pair rotatable links 39. Each of the rotatable links 39 has a plane surface on the top periphery along the length thereof, an enlarged head including an upper truncate surface 392 and a lower truncate surface 393. A rotor 34 sleeves on the link 39 stopped against the enlarged head and has positioning slot in an end for retaining another enlarged head 381 of the steel wire 38, an annular groove 342 abutting the slot 341 for winding the steel wire 38 therein and a crescent central bore 343 engaged with the body of the rotatable link 39 which is then inserted into the crescent thru hole 351 of the footboard via the circular thru hole 301 of the central seat 30. A spring plate 303 disposes to the inner side abutting the circular thru hole 301 (as shown in FIGS. 9 and 14) to stepped against the upper truncate surface 392 or lower truncate surface of the rotatable link 39 to have the link 39 stopped in a certain angle. The steel wire 38 extends through the axial ring of the axial pipe 32 into the insertion rod 37 and is protected by a cover 302 (as shown in FIG. 6).

Referring to FIG. 8, the female pipe 33 has a press pate 331 under the bottom inserted into the axial pipe 32 and the male pipe 332 has a cushion 3321 on the bottom. When the male pipe 332 is pressed down to engaged into the female pipe 33, the cushion 3321 presses the press plate 331 which then presses the rotor 34 to force the rotor 34 from rotation. When the male pipe 332 is moved upward a no more pressure is on the press plate 331. So that though the press plate 331 is still contact with the rotor 34, the rotor 34 can be rotated in despite of the external fore 10.

Referring to FIGS. 7 to 11 of the drawings, in operation, draw the male pipe 332 up and tread upon the footboard 35 down to rotor the rotor for a certain angle, the lower truncate surface 393 of the link 39 leaves the spring place 303 and the upper truncate surface 392 of the link 39 contacts the spring plate 303 (as shown in FIGS. 12 to 15) so that the rotor 34 draws the steel wire 38 which draws the insertion rod 37 backward to disengage with the positioning hole 242 of the subordinate prop 24 so as to set the subordinate prop 24 free to rotate away from the main prop 23. When the suitcase 40 is tilt, the main prop 23 moves away centered on the axial pin 21 and the subordinate prop 24 move to the direction opposite to the main prop 23. This time, both the wheels 231 and 241 contact to the ground and the suitcase 40 can side on four wheels. Since the weight is totally burdened by the wheel, the traveler uses no strength to pull the suitcase 40 (as shown in FIG. 5). When straightens the suitcase 40 up, both the main prop 23 and the subordinate prop 24 return to their original position press the male pipe 332 downward to force the press plate 331 to move down too to make the rotor 34 rotating to its original position. So that steel wire 38 is released and not to draw the insertion rod 37 which engages again with the positioning hole 242 by the resilience of the spring 361. Since the two props 23 and 24 are returned to their original position, this circumstance facilitates the suitcase 40 to pull to upstairs (as shown in FIG. 17).

Referring go FIG. 16, an alternate embodiment of the present invention is provided. This embodiment is structurally and functionally most similar to the above embodiment. The above discussions a applicable in the most instances. The difference is that both the footboard 35, the rotor 34 the spring plate 303 and the rotatable link 39 are omitted, the other enlarged end 382 of the steel wire 38 directly connected to the male pipe 332 via the axial ring 321 and the axial pipe 32. When pull up the male pipe 332 to tense the steel wire 38, the insertion rod 37 is drawn out to disengage with the positioning hole 242 of the subordinate prop 24. Then the operation is shown in FIGS. 4 and 5 as discussed in the above embodiment.

Accordingly the wheel rack improvement of a trolley suitcase of the present invention has the following features and advantages:

a) it can be slid with two wheels or four wheels and the change is very easy, b) if to lower down the center of weight for the suitcase and to enlarge the distance of the wheels, the push of the suitcase will be more stable and the pull of the suitcase will be more easier, c) the wheels and the male and female pipes share the weight of the suitcase that may elongate the time of usage, and d) to pull the suitcase upstairs will not harm the suitcase and save the strength.

The specification relating to the above embodiment should be construed as exemplary rather than as limitative of the present invention, with many variations and modifications being readily attainable by a person of average skill in the art without departing from the spirit or scope thereof as defined by the appended claims and their legal equivalents.

I claim:

1. A wheel rack improvement of a trolley suitcase comprising:

a suitcase;

a pair of corner seats spacedly and symmetrically secured to a pair of lower corners of the suitcase each having a first thru hole, a second thru hole and a third thru hole spacedly formed in an inward peripheral wall, a main prop including a first wheel on lower end, a lower axial hole engaged with the first thru hole and rotatably secured by a first axial pin, an upper axial hole adjacent a top thereof, an upper axial hole adjacent a top thereof, an axial rod on a lateral side opposite to the lower axial hole, an arcuate rib above the lower axial hole and a depression above the first wheel, and a subordinate prop having a second wheel on lower end engageable into the depression of the main prop, a positioning hole in a lower portion above the second wheel engageable with the third thru hole of the corner seat, an oblong hole on an upper portion engaged with the axial rod of the main prop and an axial hole abutting the oblong hole engaged with the second thru hole of the corner seat and rotatably secured by a second axial pin;

an insertion rod inserted into the third thru hole of the corner seat having a bevel angle on forward end engageable with the positioning hole of the subordinate prop, a slot in a top periphery for retaining an enlarged head of a steel wire;

a positioning cap which has a central bore wrapped on the insertion rod and screw secured to an inward periphery of the corner seat and biased by a spring means therebetween;

a rotatable link having a plane surface on a top periphery along the length thereof, an enlarged head including an upper truncate surface and a lower truncate surface;

a rotor sleeved onto the rotatable link stopped against the enlarged head of the link and having a slot in an inward end for retaining another enlarged head of the steel wire, an annular groove abutting the slot for winding the steel wire therein and a crescent central bore engageable with the rotatable link;

a central seat secured to a center lower portion of the suitcase between the pair of corner seat having a pair of positioning plates spacedly formed an inner side, a pair of circular thru holes in lateral side for rotatably secured a footboard by the rotatable link, said footboard having a crescent central bore engageable with the rotatable link;

a pair of spring plate spacedly disposed in the inner side of the central seat abutting one side of the rotor and the circular thru holes of the central seat;

a pair of axial pipes spacedly secured to the positioning plates of the central seat each having an axial ring on an upper periphery toward the corner seats;

a cover snap covering the cap, the steel wire and the axial ring in which the steel wire is passing through;

a pair of female pipes each having a press plate on underside inserted into the axial pipes;

a pair of male pipe each having a cushion on bottom inserted into the female pipes.

2. A wheel rack improvement of a trolley suitcase comprising:

a suitcase;

a pair of corner seats spacedly and symmetrically secured to a pair of lower corners of the suitcase each having a first thru hole, a second thru hole and a third thru hole spacedly formed in an inward wall, a main prop including a first wheel on lower end, a lower axial engaged with the first thru hole and rotatably secured by a first axial pin, an upper axial hole adjacent a top thereof, an axial rod on a lateral side opposite to the lower axial hole, an arcuate rib above the lower axial hole and a depression above the first wheel, and a subordinate prop having a second wheel on lower end engageable into the depression of the main prop, a positioning hole in a lower portion above the second wheel engageable with the third thru hole of the corner seat, an oblong hole on an upper portion engaged with the axial rod of the main prop and an axial abutting the oblong hole engaged with the second thru hole of the corner seat and rotatably secured by a second axial pin;

an insertion rod inserted into the third thru hole of the corner seat having a bevel angle on forward end engageable with the positioning hole of the subordinate prop, a slot in a top periphery thereof;

a positioning cap which has a central bore wrapped on the insertion rod and screw secured to an inward periphery of the corner seat and biased by a spring mean therebewteen;

a pair of axial pipes spacedly secured to a central lower portion of the suitcase between the corner seats each having an axial ring on an upper periphery toward the corner seat;

a pair of female pipes axially inserted into the pair of axial pipes respectively;

a pair of male pipes axially inserted into the female pipes respectively and each having a cushion and a central bore in the bottom thereof;

a pair of steel wire each having a first enlarged end retained in the slot of the insertion rod and extending through the positioning cap, the axial ring, the female pipe and then a second enlarged end secured into the bottom of the male pipe;

a cap snap covering the cap, the steel wire and the axial ring.

\* \* \* \* \*